United States Patent
Ilie et al.

(10) Patent No.: US 11,640,004 B2
(45) Date of Patent: May 2, 2023

(54) WAVEFRONT GLOBAL NAVIGATION SATELLITE SYSTEM AND INTERFERENCE SIMULATOR SYSTEMS AND METHODS OF USE THEREOF

(71) Applicant: Orolia Canada Inc., Montreal (CA)

(72) Inventors: Iurie Ilie, Saint-Lazare (CA); Pierre-Marie Le Veel, Montréal (CA); Stephane Hamel, Longueuil (CA); Serge Malo, Montréal (CA); Julien Edmond, Montréal (CA)

(73) Assignee: OROLIA CANADA INC., Montreal (CA)

( * ) Notice: Subject to any disclaimer, the term of this patent is extended or adjusted under 35 U.S.C. 154(b) by 186 days.

(21) Appl. No.: 16/837,706

(22) Filed: Apr. 1, 2020

(65) Prior Publication Data

US 2021/0096265 A1    Apr. 1, 2021

Related U.S. Application Data

(60) Provisional application No. 62/907,042, filed on Sep. 27, 2019.

(51) Int. Cl.
*G01S 19/23* (2010.01)
*G01S 19/21* (2010.01)

(52) U.S. Cl.
CPC .......... *G01S 19/23* (2013.01); *G01S 19/21* (2013.01); *G01S 19/235* (2013.01); *G01S 19/215* (2013.01)

(58) Field of Classification Search
CPC .................. G01S 19/235; G01S 19/23
See application file for complete search history.

(56) References Cited

U.S. PATENT DOCUMENTS

| 6,339,399 B1 * | 1/2002 | Andersson | H01Q 3/267 342/174 |
| 6,708,020 B1 * | 3/2004 | Hiramatsu | H01Q 3/267 342/368 |

(Continued)

FOREIGN PATENT DOCUMENTS

| CN | 105911571 A | 8/2016 | |
| GB | 2313523 A * | 11/1997 | H01Q 3/267 |

OTHER PUBLICATIONS

Pozzobon et al. "Developing a GNSS Position and Timing Authentication Testbed." Inside GNSS. Jan./Feb. 2013. pp. 45-53. (Year: 2013).*

(Continued)

*Primary Examiner* — Gregory C. Issing
(74) *Attorney, Agent, or Firm* — Troutman Pepper Hamilton Sanders LLP (Rochester)

(57) ABSTRACT

A method includes outputting a plurality of simulated global navigation satellite system (GNSS) and interference signal pairs comprising a simulated GNSS signal and a simulated interference signal. Each of the simulated GNSS signals, or the simulated interference signals, has an associated reference signal. A calibration GNSS signal that combines the simulated GNSS signals and the associated reference signals, or a calibration interference signal that combines the simulated interference signals and the associated reference signals is received. A phase, time, or a power offset is calculated for the simulated GNSS signals based on the calibration GNSS signal and the associated reference signals, or for the simulated interference signals based on the calibration interference signal and the associated reference signals. A corrected plurality of simulated GNSS and interference signal pairs are output based on the calculated phase, (Continued)

time, or power offset for the simulated GNSS signals or for the simulated interference signals.

15 Claims, 5 Drawing Sheets

(56) References Cited

U.S. PATENT DOCUMENTS

| | | | | |
|---|---|---|---|---|
| 7,079,866 | B2* | 7/2006 | Takano | H01Q 3/267 |
| | | | | 455/562.1 |
| 7,292,877 | B2* | 11/2007 | Yoon | H04B 17/12 |
| | | | | 455/67.11 |
| 8,040,276 | B2 | 10/2011 | Vadlamani et al. | |
| 8,854,260 | B2 | 10/2014 | Boulton | |
| 9,103,912 | B2* | 8/2015 | Yudanov | G01S 19/33 |
| 9,116,232 | B2 | 8/2015 | Goel et al. | |
| 9,246,607 | B2 | 1/2016 | Reed et al. | |
| 9,473,258 | B2 | 10/2016 | Pearse et al. | |
| 9,880,284 | B2 | 1/2018 | Pearse et al. | |
| 10,812,116 | B1* | 10/2020 | El-Assir | H04B 1/405 |
| 2010/0001898 | A1 | 1/2010 | Fu et al. | |
| 2010/0127918 | A1* | 5/2010 | Vadlamani | G01S 19/23 |
| | | | | 342/357.62 |
| 2012/0001810 | A1* | 1/2012 | Soualle | G01S 19/02 |
| | | | | 343/703 |
| 2016/0050034 | A1* | 2/2016 | Pearse | H04B 17/21 |
| | | | | 455/67.14 |
| 2020/0132856 | A1* | 4/2020 | Pearse | H04B 17/12 |

OTHER PUBLICATIONS

A. Rügamer et al., "Setup and verification of a multi-GNSS over-the-airwave field synthesis testbed," 2016 IEEE/ION Position, Location and Navigation Symposium (PLANS), 2016, pp. 863-873. (Year: 2016).*

C. Schirmer et al., "Accuracy of an OTA system emulating a realistic 3D environment for GNSS and multi-satellite receiver testing," 2014 IEEE 8th Sensor Array and Multichannel Signal Processing Workshop (SAM), 2014, pp. 113-116. (Year: 2014).*

C. Schirmer. "Over-the-Air Testing Using Wave-Field Synthesis." Universitatsverlag Ilmenau. 2018. pp. 1-211. ISBN 978-3-86360-177-5 (Druckausgabe) (Year: 2018).*

Rugamer, A. et al. "GNSS Over-the-Air Testing Using Wave Field Synthesis." Proceedings of the 26th International Technical Meeting of the ION Satellite Division, ION GNSS+. pp. 1931-1943. Sep. 2013 (Year: 2013).*

European Search Report for corresponding EP Application No. 20198284.0, dated Dec. 9, 2020.

* cited by examiner

WAVEFRONT GLOBAL NAVIGATION SATELLITE SYSTEM AND INTERFERENCE SIMULATOR SYSTEMS AND METHODS OF USE THEREOF

This application claims the benefit of U.S. Provisional Patent Application Ser. No. 62/907,042, filed Sep. 27, 2019, which is hereby incorporated by reference in its entirety.

FIELD

This technology generally relates to systems and methods that provide wavefront global navigation satellite system (GNSS) and interference simulation.

BACKGROUND

The currently available wavefront GNSS simulators on the market are based on dedicated hardware that is specifically designed for coherent signal generation. This hardware is very expensive and bulky. Further, it is very difficult to expand the number of simulated elements, or to add the capability to coherently simulate spoofers and repeaters. The complexity of the hardware setup can be exponential and unpractical. In addition, the phase, time, and/or power offset between channels is prone to changes during the simulation that add errors to the simulated coherent signals.

SUMMARY

A method includes outputting, by a computing device, a plurality of simulated global navigation satellite system (GNSS) and interference signal pairs each comprising a simulated GNSS signal and a simulated interference signal to a plurality of radiofrequency transmitters. Each of the simulated GNSS signals, or each of the simulated interference signals, has an associated reference signal. One of a calibration GNSS signal that combines each of the simulated GNSS signals and the associated reference signals, or a calibration interference signal that combines each of the simulated interference signals and the associated reference signals is received from a radiofrequency receiver. One or more of a phase offset, a time offset, or a power offset is calculated for each of the simulated GNSS signals based on the calibration GNSS signal and the associated reference signals for each of the simulated GNSS signals, or for each of the simulated interference signals based on the calibration interference signal and the associated reference signals for each the simulated interference signals. A corrected plurality of simulated GNSS and interference signal pairs are output to the plurality of radiofrequency transmitters based on the calculated phase offset, time offset, or power offset for each of the simulated GNSS signals or for each of the simulated interference signals.

A non-transitory machine readable medium having stored thereon instructions comprising executable code that when executed by one or more processors, cause the processors to output a plurality of simulated global navigation satellite system (GNSS) and interference signal pairs each comprising a simulated GNSS signal and a simulated interference signal to a plurality of radiofrequency transmitters. Each of the simulated GNSS signals, or each of the simulated interference signals, has an associated reference signal. One of a calibration GNSS signal that combines each of the simulated GNSS signals and the associated reference signals, or a calibration interference signal that combines each of the simulated interference signals and the associated reference signals is received from a radiofrequency receiver. One or more of a phase offset, a time offset, or a power offset is calculated for each of the simulated GNSS signals based on the calibration GNSS signal and the associated reference signals for each of the simulated GNSS signals, or for each of the simulated interference signals based on the calibration interference signal and the associated reference signals for each the simulated interference signals. A corrected plurality of simulated GNSS and interference signal pairs are output to the plurality of radiofrequency transmitters based on the calculated phase offset, time offset, or power offset for each of the simulated GNSS signals or for each of the simulated interference signals.

A wavefront GNSS and interference simulation apparatus includes a memory comprising programmed instructions stored thereon and one or more processors configured to be capable of executing the stored programmed instructions to output a plurality of simulated global navigation satellite system (GNSS) and interference signal pairs each comprising a simulated GNSS signal and a simulated interference signal to a plurality of radiofrequency transmitters. Each of the simulated GNSS signals, or each of the simulated interference signals, has an associated reference signal. One of a calibration GNSS signal that combines each of the simulated GNSS signals and the associated reference signals, or a calibration interference signal that combines each of the simulated interference signals and the associated reference signals is received from a radiofrequency receiver. One or more of a phase offset, a time offset, or a power offset is calculated for each of the simulated GNSS signals based on the calibration GNSS signal and the associated reference signals for each of the simulated GNSS signals, or for each of the simulated interference signals based on the calibration interference signal and the associated reference signals for each the simulated interference signals. A corrected plurality of simulated GNSS and interference signal pairs are output to the plurality of radiofrequency transmitters based on the calculated phase offset, time offset, or power offset for each of the simulated GNSS signals or for each of the simulated interference signals.

A wavefront GNSS and interference simulation system includes a wavefront GNSS and interference simulation apparatus that includes a memory comprising programmed instructions stored thereon and one or more processors configured to be capable of executing the stored programmed instructions to output a plurality of simulated global navigation satellite system (GNSS) and interference signal pairs each comprising a simulated GNSS signal and a simulated interference signal to a plurality of radiofrequency transmitters. Each of the simulated GNSS signals, and/or each of the simulated interference signals, has an associated reference signal. A calibration GNSS signal that combines each of the simulated GNSS signals and the associated reference signals, and/or a calibration interference signal that combines each of the simulated interference signals and the associated reference signals is received from a radiofrequency receiver. One or more of a phase offset, a time offset, or a power offset are calculated for each of the simulated GNSS signals based on the calibration GNSS signal and the associated reference signals for each of the simulated GNSS signals, and/or for each of the simulated interference signals based on the calibration interference signal and the associated reference signals for each the simulated interference signals. A corrected plurality of simulated GNSS and interference signal pairs are output to the plurality of radiofrequency transmitters based on the calculated phase offset, time offset, or power offset for each of the simulated GNSS signals and/or for each of the simulated interference signals. A plurality of radiofrequency transmitters are coupled to the wavefront GNSS and interference apparatus to receive the output plurality of simulated GNSS and interference signal pairs and convert the plurality of simulated GNSS and interference signal pairs to radiofrequency outputs. A calibration device is coupled to the plurality of radiofrequency transmitters to receive the radiofrequency outputs and combine each of the simulated GNSS signals and the associated reference signals to form the calibration GNSS signal and/or to combine each of the simulated interference signals and the associated interference reference signals to form the calibration interference signal. A radiofrequency receiver is coupled to the wavefront GNSS and interference apparatus to convert the calibration GNSS signal and/or the calibration interference signal to a baseband signal for use by the wavefront GNSS and interference simulation apparatus.

This technology provides a number of advantages including providing systems and methods for GNSS and interference simulation that are software-driven, easily expandable and customizable, and that eliminate expensive and complex hardware. The technology also allows for continuous monitoring and adjustment of the phase, time, and/or power offset between channels during simulation, which improves accuracy of the simulation.

DETAILED DESCRIPTION

Figure 1:
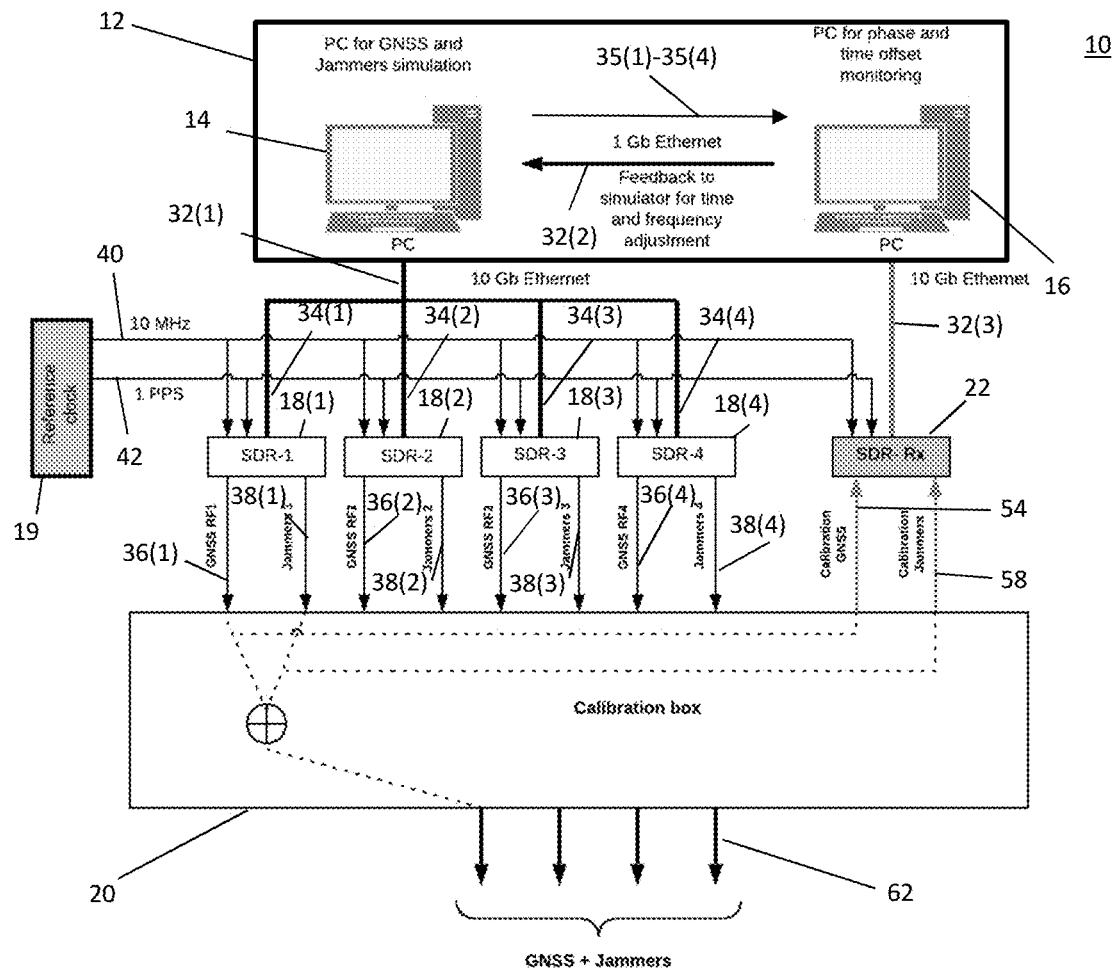
FIG. 1 is a block diagram of an example of a global navigation satellite system (GNSS) and interference simulator system.

An example of a wavefront global navigation satellite system (GNSS) and interference simulator system 10 that provides an enhanced software-driven wavefront modulation system with continuous monitoring and adjustment of phase, time, and/or power offset between channels is illustrated in FIG. 1. In this example, the wavefront GNSS and interference simulator system 10 includes a wavefront simulator apparatus 12 that incorporates a simulation computing device 14 and an offset monitoring computing device 16, transmit software defined radios (transmit SDRs) 18(1)-18 (4), a calibration device 20, and a receive software defined radio (receive SDR) 22, although other types and/or numbers of other systems, devices, components, and/or other elements in other configurations may be used, such as other types and/or numbers of transmitters and/or receivers. This technology provides a number of advantages including providing a relatively low cost, easily upgradeable wavefront simulation system that allows for simulation of coherent GNSS and interference signals with precise phase, time, and power offset adjustment.

In this example, the wavefront simulator apparatus 12 incorporates a simulation computing device 14 and an offset monitoring computing device 16, although in other examples, wavefront simulator apparatus 12 may include other types and/or numbers of devices, such as additional hardware and/or electronics. Two separate computing devices are utilized in this example for advantages of distributed processing. However, in yet another example, the wavefront simulator apparatus 12 may include a single computing device that provides both wavefront simulation and offset monitoring functionality.

Figure 2:
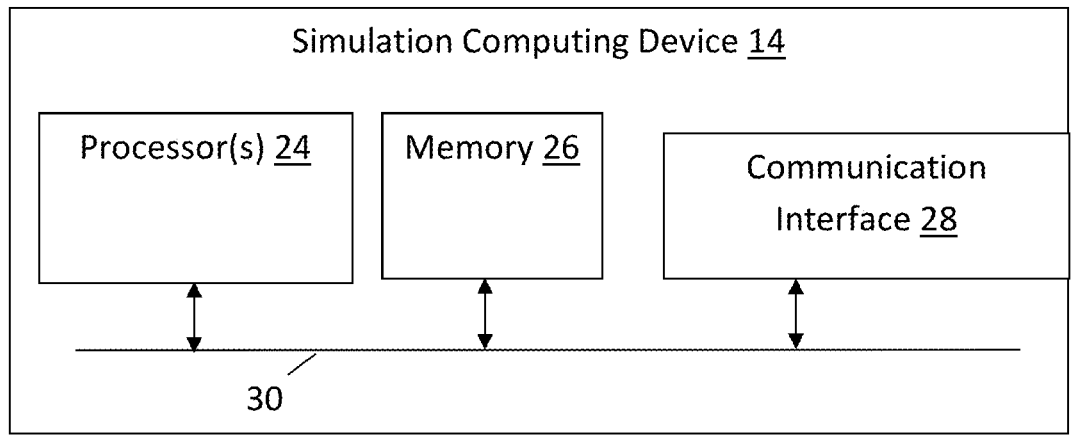
FIG. 2 is a block diagram of an example of a simulation computing device of the GNSS and interference simulator system of FIG. 1.

Referring now to FIG. 2, in this example the simulation computing device 14 includes one or more processor(s) 24, a memory 26, and a communication interface 28 that are coupled together by a bus 30 or other communication link, although the simulation computing device 14 can include other types and/or numbers of elements in other configurations.

The processor(s) 24 of the simulation computing device 14 may execute programmed instructions stored in the memory 26 for any number of the functions or other operations illustrated and described by way of the examples herein, including generating GNSS and interference signals, by way of example only. The processor(s) 24 of the simulation computing device 14 may include one or more graphic processing units (GPUs), CPUs, or general processors with one or more processing cores, for example, although other types of processor(s) can be used. In this example, the high rate data processing for modulation of the GNSS and interference signals is performed using GPUs, although other types and/or numbers of processors may be utilized.

The memory 26 of the simulation computing device 14 stores the programmed instructions for one or more aspects of the present technology as illustrated and described herein, although some or all of the programmed instructions could be stored elsewhere. A variety of different types of memory storage devices, such as random access memory (RAM), read only memory (ROM), hard disk drive (HDD), solid state drives (SSD), flash memory, or other computer readable medium that is read from and written to by a magnetic, optical, or other reading and writing system that is coupled to the processor(s) 24 can be used for the memory 26.

Figure 5:
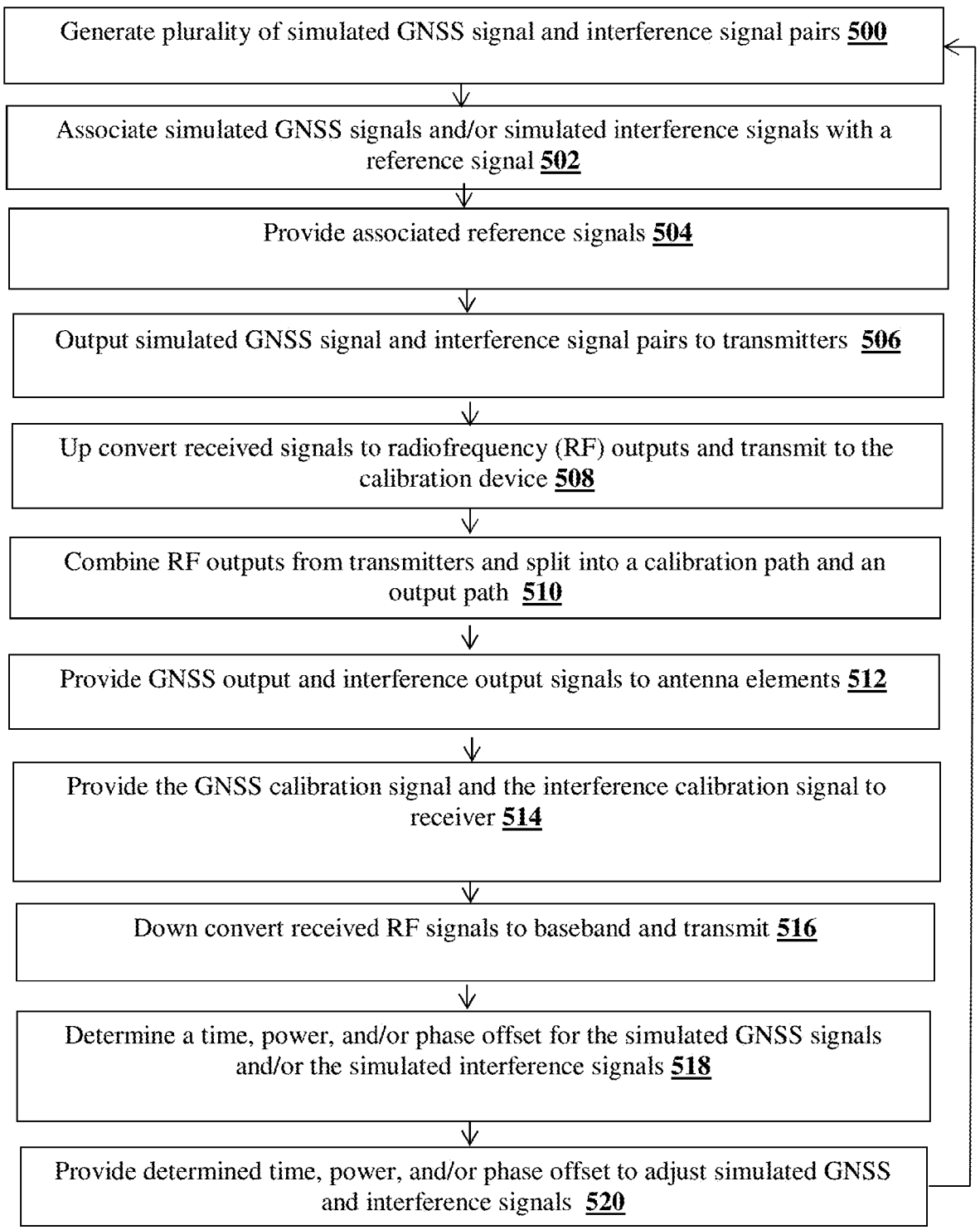
FIG. 5 is a flow chart of an example of a method for GNSS and interference simulation using the GNSS and interference simulator system of FIG. 1.

Accordingly, the memory 26 of the simulation computing device 14 can store application(s) that can include executable instructions that, when executed by the simulation computing device 14, cause the simulation computing device 14 to perform actions, such as to generate, transmit, receive, or otherwise process signals for the modulation of simulated GNSS signals and interference signals, or other reference signals, and to perform other actions illustrated and described by way of the examples herein, such as in FIG. 5. The application(s) can be implemented as modules or components of other application(s). Further, the application(s) can be implemented as operating system extensions, modules, plugins, or the like. In one example, the application stored on the simulation computing device 14 is a software-defined GNSS/GPS simulator such as the Skydel software produced by Orolia Canada (Montreal, Canada), although other simulation application(s) for generating simulated GNSS and interference signals may be stored in the memory 26 the simulation computing device 14.

Figure 6:
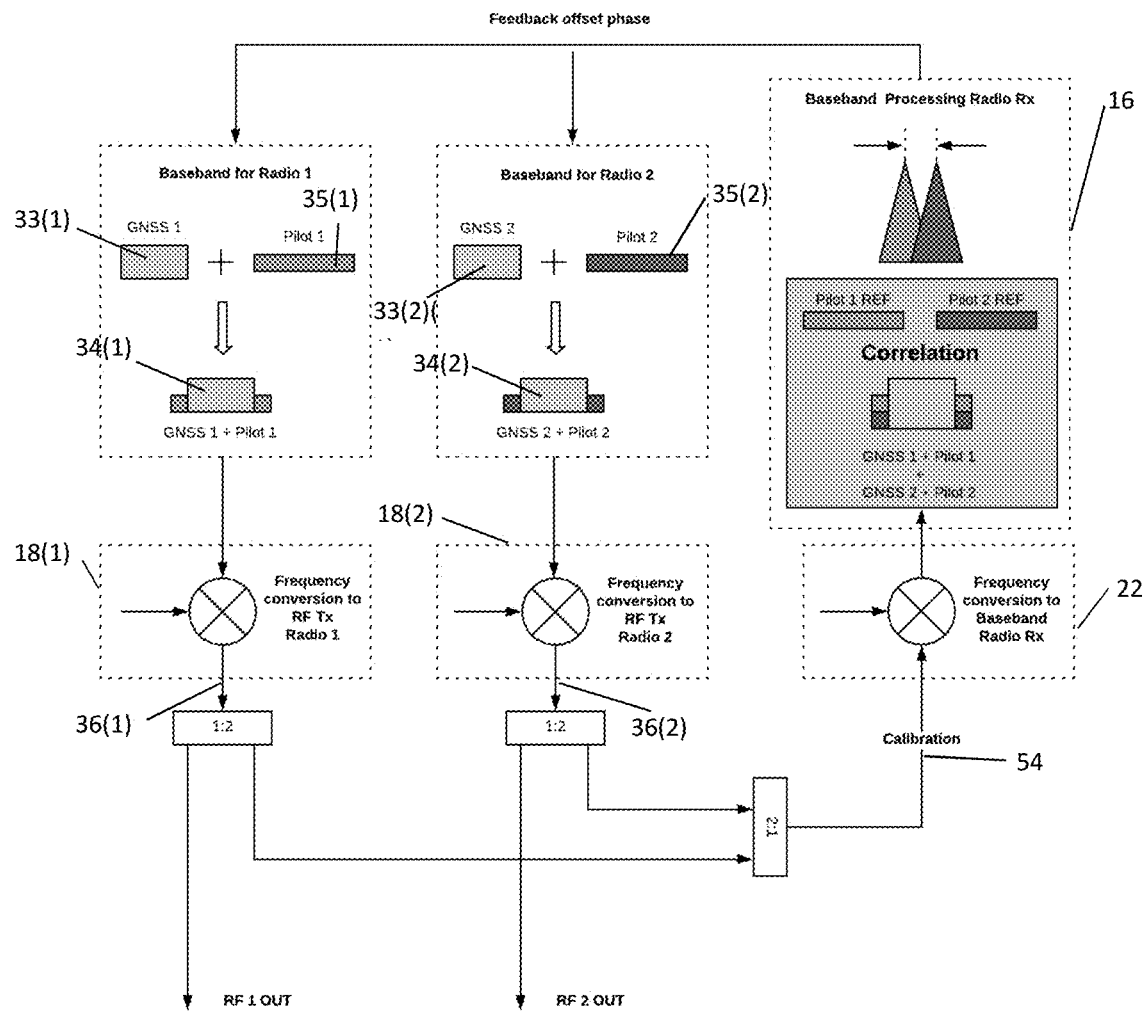
FIG. 6 is a block diagram illustrating one example of a feedback protocol for the GNSS and interference simulator system of FIG. 1.

The simulation computing device 14 is configured to generate digital complex IQ baseband signals 34(1)-34(4), as shown in FIG. 1, that provide simulated GNSS signals and interface signal pairs. The term interference is used to designate non-intentional and intentional jammers, as well as spoofers and repeaters, that can be simulated, although other interference signals may be employed. In one example, each of the GNSS signals can be coupled with a reference signal, while in other examples the interference signals could also include a reference signal. Referring more specifically to FIG. 6, an example with complex baseband signals 34(1) and 34(2) is illustrated. Although only baseband signals 34(1) and 34(2) are illustrated and described with respect to FIG. 6, the operation would be the same for baseband signals 34(3) and 34(4). In this example, the baseband signals 34(1) and 34(2) include GNSS signals 33(1) and 33(2) combined with reference signals 35(1) and 35(2), although the same operation could be performed with the interference signals as described below (the interference signals are not illustrated in FIG. 6 merely for clarity purposes).

Referring again to FIG. 1, the GNSS signals may be simulated to operate on any navigation system, such as by way of example only, GPS, BeiDou, Galileo, or GLONASS. The simulated interference signals may include, by way of example only, spoofers, repeaters, or jammers, although other interference signals may be generated. In one example, each of the generated plurality of simulated GNSS signal and interference signal pairs are coherent. The simulation computing device 14 is also configured to generate reference signals 35(1)-35(4) that are be associated with the simulated GNSS signals of the baseband signals 34(1)-34(4) used for the feedback process described herein. The simulation computing device 14 can also output the reference signals 35(1)-35(4) to the offset monitoring computing device 16, by way of example.

The communication interface 28 of the simulation computing device 14, as shown in FIG. 2, operatively couples and allows for communication between the simulation computing device 14, the transmit SDRs 18(1)-18(4), and the offset monitoring computing device 16, which are all coupled together by one or more communication network(s) 32(1), 32(2), as shown in FIG. 1, although other types and/or numbers of connections and/or configurations to other device and/or elements can be used. In this example, the simulation computing device 14 is coupled to the transmit SDRs 18(1)-18(4) by a high data rate (e.g., 10 Gb) Ethernet connection 32(1) and to the offset monitoring computing device 16 by a low rate (e.g., 1 Gb) Ethernet connection 32(2), although other topologies may be employed, including the use of the same communication network. By way of example only, the communication network(s) 32(1), 32(2) can include any number and/or types of communication networks, such as described herein. local area network(s) (LAN(s)) or wide area network(s) (WAN(s)), and/or wireless networks, although other types and/or number of protocols and/or communication network(s) can be used.

Referring again to FIG. 1, in this example, four transmit SDRs 18(1)-18(4) are employed. By way of example only, the transmit SDRs 18(1)-18(4) could be the USRP X300 or the USRP N310 made by Ettus Research (Austin, Tex.), although other SDRs, or other transmitters, could be utilized. The transmit SDRs 18(1)-18(4) are coupled to the simulation computing device 14 of the wavefront simulation apparatus 12 by communication network 32(1) to receive the digital complex IQ baseband signals 34(1)-34(4) used for generating the simulated GNSS and interference signals, although any number of transmit SDRs may employed to receive the baseband signals. Although SDRs are described, it is to be understood that other radiofrequency transmitters could be employed. The baseband signals 34(1)-34(4) are continuously streamed in real-time to the transmit SDRs 18(1)-18(4). Each of the transmit SDRs 18(1)-18(4) receives an independent one of the baseband signals 34(1)-34(4) from the simulation computing device 14.

The transmit SDRs 18(1)-18(4) are configured to up convert the digital complex IQ baseband signals 34(1)-34(4) to radiofrequency (RF) outputs. In this example, each of the transmit SDRs 18(1)-18(4) generate first RF outputs 36(1)-36(4) used to generate a simulated GNSS signal and second RF outputs 38(1)-38(4) used to generate a simulated interference signal, although other types and/or numbers of RF outputs can be utilized. In this example, the reference clock 19 is coupled to each of the transmit SDRs 18(1)-18(4) and the receive SDR 22 to synchronize each of these transmit and receive SDRs. The reference clock 19 utilizes both a 10 MHz clock signal 40 and a 1 PPS clock signal 42 as illustrated in FIG. 1, although other clock signals may be employed for synchronization.

Figure 4:
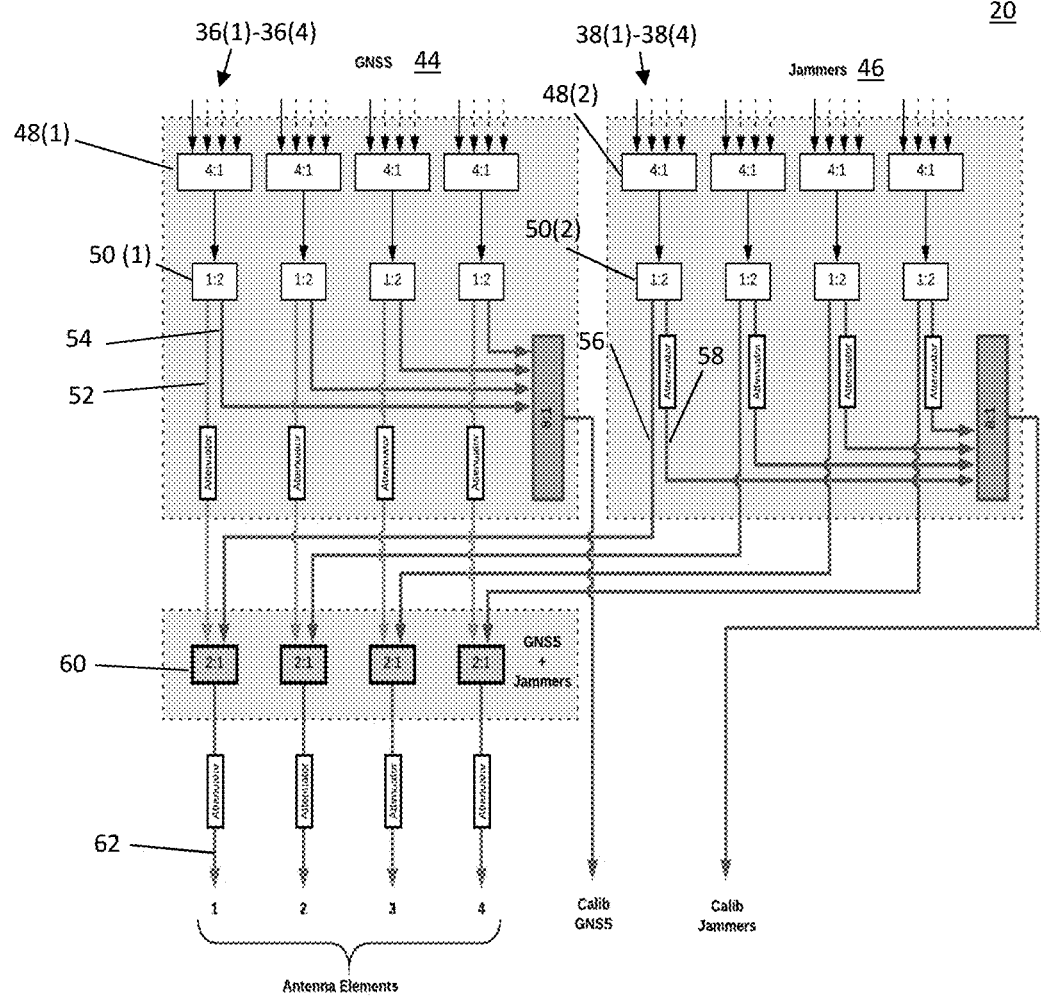
FIG. 4 is a block diagram of an example of a calibration device of the GNSS and interference simulator system of FIG. 1.

In this example, the calibration device 20 is coupled to each of the transmit SDRs 18(1)-18(4) to receive the first RF outputs 36(1)-36(4) and the second RF outputs, 38(1)-38(4) for generating the simulated GNSS signal and the simulated interference signal, respectively, from each of the transmit SDRs 18(1)-18(4), although the calibration device may receive other types and/or numbers of signals. Referring more specifically to FIG. 4, the calibration device 20 includes a GNSS channel 44 and an interference channel 46. Each channel of the calibration device 20 includes a number of passive RF elements including combiners/splitters, although the calibration device 20 may include other types and/or numbers of passive or active elements in other configurations, such as attenuators that are utilized to adjust the power levels of the RF signals. This example in FIG. 4 illustrates the calibration device 20 receiving signals from sixteen transmitters in four groups of four. While the four transmitter SDRs 18(1)-18(4) are described in this example, the calibration device 20 can operate with additional transmit SDRs or other types of radios/transmitters in the same manner. More specifically, the calibration device 20 would operate in the same manner with the other groups of transmit SDRs as illustrated in FIG. 4.

The calibration device 20 is configured to receive the first RF outputs 36(1)-36(4) for generating the simulated GNSS signals through the GNSS channel 44, and the second RF outputs 38(1)-38(4) for generating the simulated interference signals through the interference channel 46. The calibration device 20 combines the first RF outputs 36(1)-36(4) at 4:1 combiner 48(1) and the second RF outputs 38(1)-38(4) at 4:1 combiner 48(2). The use of four inputs allows for coverage of the entire GNSS spectrum for both the GNSS and interference signals. The calibration device 20 then splits the signals in each channel 44, 46 using 1:2 splitters 50(1), 50(2), respectively, to provide a GNSS output signal 52 and GNSS calibration signal 54, as well as interference output signal 56 and an interference calibration signal 58.

The calibration device 20 combines the GNSS output signal 52 and the interference output signal 56 using 2:1 combiner 60 to generate a combined simulated GNSS/interference signal 62. The calibration device 20 is coupled to an antenna element (not shown) to allow for transmission of the combined simulated GNSS/interference signal 62. FIG. 4 shows an example where four combined signals 62 are generated, but other numbers of signals may be generated using other numbers of SDRs or other types of transmitters. The calibration device 20 outputs the GNSS calibration signal 54 and the interference calibration signal 58 to the receive SDR 22, as shown in FIG. 1. Referring again to FIG. 4, in one example multiple GNSS calibration signals and interference signals may be combined prior to being output to the receive SDR 22.

Referring again to FIG. 1, in this example, the receive SDR 22 is coupled to the calibration device 20 to receive the GNSS calibration signal 54 and the interference calibration signal 58. By way of example only, the receive SDR 22 could be the USRP X300 or the USRP N310 made by Ettus Research (Austin, Tex.), although other SDRs could be utilized for the receive SDR. The receive SDR 22 is configured to down convert the received RF signals back to baseband. Although a receive SDR 22 is described, it is to be understood that other radiofrequency receivers could be employed In this example, the receive SDR 22 is coupled to the offset monitoring computing device 16 through a high rate (e.g., 10 Gb) Ethernet connection 32(3), although other topologies may be employed.

Figure 3:
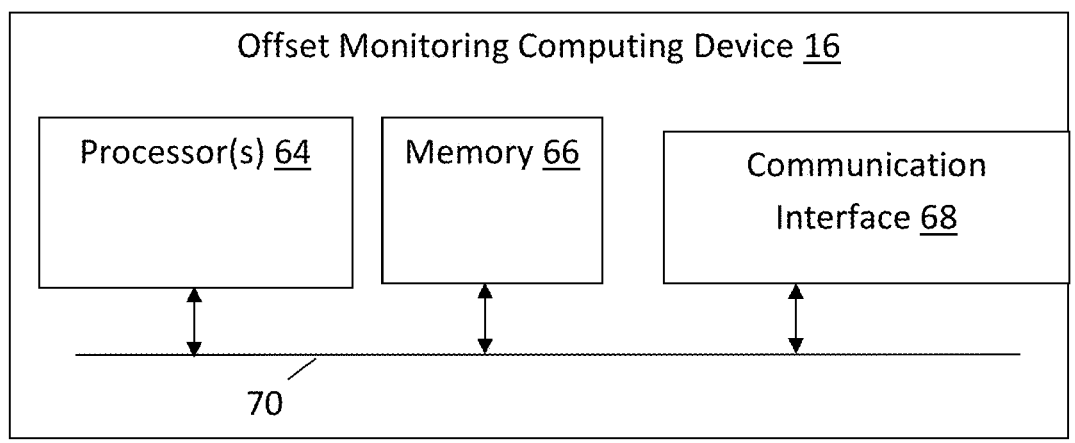
FIG. 3 is a block diagram of an example of a offset monitoring computing device of the GNSS and interference simulator system of FIG. 1.

Referring now to FIG. 3, in this example the offset monitoring computing device 16 includes one or more processor(s) 64, a memory 66, and a communication interface 68 that are coupled together by a bus 70 or other communication link, although the offset monitoring computing device 16 can include other types and/or numbers of elements in other configurations. In another example, the functions of the offset monitoring computing device 16 may be performed on the simulation computing device 14.

In this example, the processor(s) 64 of the offset monitoring computing device 16 may execute programmed instructions stored in the memory 66 for any number of the functions or other operations illustrated and described by way of the examples herein, including monitoring phase, time/or, and power offsets for the GNSS calibration signal 54 and/or interference calibration signal 58, as well as providing feedback to the simulation computing device 14 for phase, time, and power adjustment. The processor(s) 64 of the offset monitoring computing device 16 may include one or more CPUs, GPUs, or general processors with one or more processing cores, for example, although other types of processor(s) can be used.

The memory 66 of the offset monitoring computing device 16 stores the programmed instructions for one or more aspects of the present technology as illustrated and described herein, although some or all of the programmed instructions could be stored elsewhere. A variety of different types of memory storage devices, such as random access memory (RAM), read only memory (ROM), hard disk drive (HDD), solid state drives (SSD), flash memory, or other computer readable medium that is read from and written to by a magnetic, optical, or other reading and writing system that is coupled to the processor(s) 64 can be used for the memory 66.

Accordingly, the memory 66 of the offset monitoring computing device 16 can store application(s) that can include executable instructions that, when executed by the offset monitoring computing device 16, cause the offset monitoring computing device 16 to perform actions, such as performing a cross-correlation analysis of the GNSS calibration signal 54 and/or the interference calibration signal 58 to determine time and phase offset such as illustrated and described by way of the examples herein such as FIG. 6. The memory 66 of the offset monitoring computing device 16 can also store the reference signals 35(1)-35(4) generated by the simulation computing device 14 and associated with the simulated GNSS output signal 52 and/or the simulated interference output signal 56. The application(s) can be implemented as modules or components of other application(s). Further, the application(s) can be implemented as operating system extensions, modules, plugins, or the like.

The communication interface 68 of the offset monitoring computing device 16 operatively couples and communicates between the offset monitoring computing device 16, the receive SDR 22, and the simulation computing device 14, which are all coupled together by one or more communication network(s) 32)1)-32(3), although other types and/or numbers of connections and/or configurations to other device and/or elements can be used. In this example, the offset monitoring computing device 16 is coupled to the receive SDR 22 by the high data rate (e.g., 10 Gb) Ethernet connection 32(3) and to the simulation computing device 14 by the low rate (e.g., 1 Gb) Ethernet connection 32(2), although other topologies may be employed. By way of example only, the communication network(s) 32(2), 32(3) can include local area network(s) (LAN(s)) or wide area network(s) (WAN(s)), and/or wireless networks, although other types and/or number of protocols and/or communication network(s) can be used.

Although the simulation computing device 14, offset monitoring computing device 16, and the calibration device 20 are illustrated and described in the illustrative examples herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s). In some examples, the devices can be part of a rackmount system.

Portions of all of the examples of the technology illustrated and described herein may also be embodied as one or more non-transitory computer readable media having instructions stored thereon for one or more aspects of the present technology. The instructions in some examples include executable code that when executed by the processor of either the simulation computing device or the offset monitoring computing device, cause the processor to carry out steps necessary to implement the methods of the examples of this technology that are illustrated and described herein.

An example of a method for wavefront GNSS and interference simulation will now be described with reference to FIGS. 1-6. Referring more specifically to FIG. 5 in step 500, the simulation computing device 14 of the wavefront simulator apparatus 12 generates complex IQ baseband signals 34(1)-34(4) that provide a plurality of simulated GNSS signal and interference signal pairs. The GNSS signals may be simulated to operate on any navigation system, such as by way of example only, GPS, BeiDou, Galileo, or GLONASS. The simulated interference signals may include, by way of example only, spoofers, repeaters, or jammers, although other interference signals may be generated. The term interference is used to designate non-intentional and intentional jammers, as well as spoofers and repeaters, that can be simulated. In one example, each of the generated plurality of simulated GNSS signal and interference signal pairs are coherent. In one example, the baseband signals 34(1)-34(4) comprising the plurality of simulated GNSS signal and interference signal pairs are produced using a simulator stored on the simulation computing device such as the Skydel software produced by Orolia Canada (Montreal, Canada), although other simulation application(s) for generating simulated GNSS and interference signals may be utilized. In this example, the modulation for the plurality of simulated GNSS signal and interference signal pairs is performed using graphical processing units (GPUs) of the simulation computing device 14, although other processing techniques may be utilized.

In step 502, each of the simulated GNSS signals of the baseband signals 34(1)-34(4) is associated with a corresponding one of the reference signals 35(1)-35(4) (as shown in FIG. 6, GNSS signals 33(1) and 33(2) are combined with reference signals 35(1) and 35(2)) that is used for the offset monitoring and feedback process as described below. Although the method is described with respect to the GNSS signals, in other examples, the interference signals may be associated with a reference or pilot signal. In yet other examples both the GNSS signals and the interference signals are associated with a reference or pilot signal. The reference signals 35(1)-35(4) are selected to have good correlation properties, such that they do not distort the simulated GNSS signals. In this example, the cross-correlation peaks between the GNSS signals and the reference signals 35(1)-35(4) are weaker than cross-correlation products between any two GNSS signals. The reference signals 35(1)-35(4) may be pseudorandom noise-like signal, although other reference signals may be employed.

In this example, the reference signals, 35(1)-35(4) are provided for each of the simulated GNSS signals of the baseband signals 34(1)-34(4). In another example, the interference signals may also initially include associated reference signal to establish coherency between all of the interference signals using the same method as described below. However, once coherency is established, the interference signals do not require an associated reference signal for the disclosed method. In a further example, only the interference signals are associated with reference signals.

In step 504, the simulation computing device 14 provides the associated reference signals 35(1)-35(4) to the offset monitoring computing device 16, where they may be stored in the memory 66 for use in the exemplary process described below, although in other examples the simulation computing device 14 and offset monitoring computing device 16 may be a single device such that the references are simply stored on the same device that generates the simulated signals.

Next, in step 506, the plurality of simulated GNSS signal and interference signal pairs of the baseband signals 34(1)-34(4) are output to the transmit SDRs 18(1)-18(4), although any number of transmit SDRs may be utilized in the disclosed simulation method. In one example, at least sixteen transmitters are used as shown in FIG. 4. The plurality of simulated GNSS signal and interference signal pairs are streamed continuously in real time as the digital complex IQ baseband signals 34(1)-34(4) to the transmit SDRs 18(1)-18(4). Each of the transmit SDRs 18(1)-18(4) receives an independent one of the baseband signals 34(1)-34(4) from the simulation computing device 14.

Referring again to FIG. 5, in step 508, the transmit SDRs 18(1)-18(4) up convert the digital complex IQ baseband signals 34(1)-34(4) received from the simulation computing device 14 to radiofrequency (RF) outputs 36(1)-36(4) for the GNSS signals and RF outputs 38(1)-38(4) for the interference signals, and transmit these RF outputs 36(1)-36(4) and 38(1)-38(4) for the simulated GNSS signals and the simulated interference signals to the calibration device 20. Each of the transmit SDRs 18(1)-18(4) employ two RF outputs that are used for a simulated GNSS signal and simulated interference signal, respectively, i.e. one of the RF outputs 36(1)-34(4) and one of the RF outputs 38(1)-38(n). In this example, first RF outputs 36(1)-36(4) are used for the simulated GNSS signal and the second RF outputs 38(1)-38(4) are used for the simulated interference signal. The first RF output 36(1)-36(4) are transmitted to the GNSS channel 44 of the calibration device 20, while the second RF outputs 38(1)-38(4) are transmitted to the interference channel 46 of the calibration device 20, as shown in FIG. 4. The transmit SDRs 18(1)-18(4) are synchronized using the 10 MHz clock signal and the 1 PPS clock signal 42 from the reference clock 19, by way of example only.

In step 510, the calibration device 20 combines the first RF outputs 36(1)-36(4) in 4:1 combiner 48(1) of the GNSS channel 44 and the second RF outputs 38(1)-38(4) in the 4:1 combiner 48(2) of the interference channel 46. Combining the four signals allows for coverage of the entire GNSS spectrum. Next, the calibration device 20 splits the received RF outputs 36(1)-36(4) and 38(1)-38(4) for the simulated GNSS signals and the simulated interference signals from each of the transmit SDRs 18(1)-18(4) to create an output path and a calibration path. As illustrated in FIG. 4, the calibration device 20 splits each pair of the simulated GNSS and interference signals 36(1)-36(4) and 38(1)-38(4) at the 1:2 splitters 50(1) and 50(2). In this system, the calibration device 20 generates the GNSS output signal 52 and the GNSS calibration signal 54 in the GNSS channel 44. The calibration device 20 also generates the interference output signal 56 and the interference calibration signal 58 in the interference channel 46.

In step 512, each of the split simulated GNSS output signal 52 and interference output signal 56 along the output path are then combined in the 2:1 combiner and are output in various channels of the calibration device 20 to antenna elements for simulation of the GNSS and interference signals.

In step 514, the GNSS calibration signal 54 and the interference calibration signal 58 are output, respectively, to the inputs of the receive SDR 22, as shown in FIG. 1. In one example, a plurality of calibration signals are combined by the calibration device 20 in each channel. The calibration device 20 provides the GNSS calibration signal 54 and the interference calibration signal 58 to the receive SDR 22 through the RF inputs.

In step 516, the receive SDR 22 down converts the received RF signals including the GNSS calibration signal 54 and the interference calibration signal 58 to baseband and transmits the baseband signal including the GNSS calibration signal 54 and the interference calibration signal 58 to the offset monitoring computing device 16 for further processing.

In step 518, the offset monitoring computing device 16 determines a phase, time, and power offset for the simulated GNSS output signal 52 using the baseband GNSS calibration signal 54, which includes the associated reference signals, although in other examples the baseband interference calibration signals may be utilized to establish coherency. In this example, the phase, time, and power offsets are determined using a cross-correlation technique as described with reference to FIG. 6 below.

FIG. 6 illustrates an exemplary method of determining the phase, time, and power offset for two of the exemplary GNSS signals 33(1) and 33(2) that are associated with corresponding reference signals 35(1) and 35(2) in the baseband signals 34(1) and 34(2) (the interference signals that are part of the baseband signals 34(1) and 34(2) are not shown in FIG. 6). Although not illustrated, the same method would be applied to for baseband signals 34(3) and 34(4). The GNSS signals 33(1) and 33(2) are each mixed with one of the reference signals 35(1) and 35(2) by the simulation computing device 14 and are output in baseband to transmit the SDRs 18(1) and 18(2) where they are converted to RF signals. The reference or pilot signals 35(1) and 35(2) are also provided to and stored in the offset monitoring computing device 16 for the cross-correlation process, although in other examples the reference or pilot signals 35(1) and 35(2) in this example, may be stored on the simulation computing device 14 or in other locations. The reference signals 35(1) and 35(2) stored in the offset monitoring computing device 16 are the same reference as the one added to the GNSS signals 34(1) and 34(2) during the simulation. Although the exemplary method is described with respect to the GNSS signals, it could also be employed using the interference signals, or with respect to both the GNSS signal and the interference signal.

The GNSS signals 33(1) and 33(2) and their associated pilots 35(1) and 35(2), in the illustrated example, are output by the transmit SDRs 18(1) and 18(2) as RF outputs 36(1) and 36(2), which are combined along the calibration path (along with RF outputs 36(3) and 36(4) which are not shown in FIG. 6) by the calibration device 20 in calibration GNSS signal 54. The combined signals in the calibration GNSS signal 54 are then converted back to baseband by the receive SDR 22 and transmitted to the offset monitoring computing device 16 for the cross-correlation processing.

To determine the phase, time, and power offset in step 520, one cross-correlation peak is obtained for each of the reference signals 35(1) and 35(2) using standard techniques. Each cross-correlation peak contains information about the time, power, and phase offset between the reference coming from the combined GNSS calibration signal 54 and the reference replicas stored in the offset management computing device 16. The relative time, power and phase offset between two correlation peaks are measured, averaged, and applied to the simulated combined GNSS signals 62, as shown in FIG. 1, to compensate for the phase, time, and power offset.

Referring again to FIG. 5, in step 520, the offset monitoring computing device 16 provides the determined phase, time, and power offsets to the simulation computing device 14. The simulation computing device 14 utilizes the phase and time offset to adjust the modulation of the generated simulated signals that are part of the baseband signals 34(1)-34(4), such as GNSS signals 33(1) and 33(2) as shown in FIG. 4, and the exemplary method is repeated from step 500 The GNSS and the reference signals, such as GNSS signals 33(1) and 33(2) and corresponding reference signals 35(1) and 35(2) as shown in FIG. 4, may be offset (if needed) by the same value to provide the adjustment. In this example, the signal for one channel, such as 18(1) shown in FIG. 1, is used as the reference for the adjustment. All the other elements (e.g., 18(2)-18(4)) are compared and synchronized to the reference channel, in this example 18(1).

The systems and methods of the present technology advantageously allow for wavefront GNSS and interference simulation for a fraction of the cost compared to conventional wavefront simulators. In addition, the phase, time, and power offset between channels is constantly monitored and adjusted during the simulation by using an additional SDR for recording and data analysis. This allows for the phase offset accuracy of <1 degree RMS during the simulation. These results are achieved even when the hardware utilized is not adapted to coherent processing.

Accordingly, as illustrated and described by way of the examples herein, this technology provides methods and systems that provide for GNSS and interference signal simulation with continuous time, phase, and power offset correction.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:

outputting, by a computing device, a simulation comprising a plurality of simulated global navigation satellite system (GNSS) signals to a plurality of radiofrequency transmitters configured to convert the plurality of simulated GNSS signals to radiofrequency outputs, wherein each of the simulated GNSS signals comprises a GNSS signal mixed with a reference signal;

converting, by the computing device, a calibration GNSS signal from a radiofrequency receiver to received simulated GNSS signals from the output simulated GNSS signals, wherein each of the received simulated GNSS signals comprises one of the GNSS signals mixed with one of the reference signals;

calculating, by the computing device, continuously during the simulation, a phase offset, a time offset, and a power offset for each of the received simulated GNSS signals based on a cross correlation of each of the reference signals for each of the received GNSS simulated signals in the calibration GNSS signal against a corresponding one of the stored reference signals; and outputting, by the computing device, continuously during the simulation a corrected plurality of simulated GNSS signals based on the calculated phase offset, time offset, and power offset;

wherein the outputting the plurality of simulated GNSS signals further comprises:

outputting, by the computing device, continuously during the simulation, simulated interference signals, wherein each of the simulated interference signals comprises an interference signal mixed with another reference signal;

converting, by the computing device, calibration interference signals from the radiofrequency receiver to received simulated interference signals from the output simulated interference signals;

calculating, by the computing device, continuously during the simulation another phase offset, another time offset, and another power offset for each of the received simulated interference signals based on a cross-correlation of each of the another reference signals for each of the received simulated interference signals in the calibration interference signal against a corresponding one of the stored another reference signals; and outputting, by the computing device, continuously during the simulation, a corrected plurality of simulated interference signals based on the calculated another phase offset, time offset, and power offset, wherein the output corrected plurality of simulated GNSS signals and the output corrected plurality of simulated interference signals are coherent.

2. The method of claim 1, wherein calculating the phase offset, the time offset, and the power offset comprises:
   determining, by the computing device, a cross-correlation peak between the calibration GNSS signal and at least one of the associated reference signals; and
   calculating, by the computing device, the phase offset, the time offset, and the power offset based on the determined cross-correlation peak.

3. The method of claim 1, wherein the plurality of simulated global navigation satellite system (GNSS) and interference signal pairs signals are continuously output.

4. The method of claim 1, wherein the simulated GNSS signals and a simulated interference signals are coherent.

5. The method of claim 1, wherein the phase offset, the time offset, and the power offset are calculated in real-time.

6. A non-transitory machine-readable medium having stored thereon instructions comprising executable code that when executed by one or more processors, cause the processors to:
   output a simulation comprising a plurality of simulated global navigation satellite system (GNSS) signals to a plurality of radiofrequency transmitters configured to convert the plurality of simulated GNSS signals to radiofrequency outputs, wherein each of the simulated GNSS signals comprises a GNSS signal mixed with a reference signal;
   convert a calibration GNSS signal from a radiofrequency receiver to received simulated GNSS signals from the output simulated GNSS signals, wherein each of the received simulated GNSS signals comprises one of the GNSS signals mixed with one of the reference signals;
   calculate continuously during the simulation a phase offset, a time offset, and a power offset for each of the received simulated GNSS signals based on a cross correlation of each of the reference signals for each of the received GNSS simulated signals in the calibration GNSS signal against a corresponding one of the stored reference signals; and
   output continuously during the simulation a corrected plurality of simulated GNSS signals based on the calculated phase offset, time offset, and power offset;
   wherein the output of the simulation comprising the plurality of simulated GNSS signals further comprises instructions to:
   output, continuously during the simulation, simulated interference signals, wherein each of the simulated interference signals comprises an interference signal mixed with another reference signal;
   convert calibration interference signals from the radiofrequency receiver to received simulated interference signals from the output simulated interference signals;
   calculate, continuously during the simulation, another phase offset, another time offset, and another power offset for each of the received simulated interference signals based on a cross-correlation of each of the another reference signals for each of the received simulated interference signals in the calibration interference signal against a corresponding one of the stored another reference signals; and
   output continuously during the simulation a corrected plurality of simulated interference signals based on the calculated another phase offset, time offset, and power offset, wherein the output corrected plurality of simulated GNSS signals and the output corrected plurality of simulated interference signals are coherent.

7. The medium of claim 6 having stored thereon at least one additional instruction comprising executable code that when executed by the one or more processors, cause the one or more process to:
   determine a cross-correlation peak between the calibration GNSS signal and at least one of the associated reference signals; and
   calculate the phase offset, the time offset, and the power offset based on the determined cross-correlation peak.

8. The medium of claim 6, wherein the plurality of simulated global navigation satellite system (GNSS) and interference signals are continuously output.

9. The medium of claim 6, wherein the simulated GNSS signals and the simulated interference signals are coherent.

10. The medium of claim 6, wherein the phase offset, the time offset, and the power offset are calculated in real-time.

11. A wavefront GNSS and interference simulation apparatus comprising:
    a memory comprising programmed instructions stored thereon and one or more processors configured to be capable of executing the stored programmed instructions to:
    output a simulation comprising a plurality of simulated global navigation satellite system (GNSS) signals to a plurality of radiofrequency transmitters configured to convert the plurality of simulated GNSS signals to radiofrequency outputs, wherein each of the simulated GNSS signals comprises a GNSS signal mixed with a reference signal, wherein each of the reference signals is stored and wherein cross-correlation peaks between the GNSS signals and the reference signals are weaker than cross-correlation products between any two of the GNSS signals;
    convert a calibration GNSS signal from a radiofrequency receiver to received simulated GNSS signals from the output simulated GNSS signals, wherein each of the received simulated GNSS signals comprises one of the GNSS signals mixed with one of the reference signals;
    calculate continuously during the simulation a phase offset, a time offset, and a power offset for each of the received simulated GNSS signals based on a cross correlation of each of the reference signals for each of the received GNSS simulated signals in the calibration GNSS signal against a corresponding one of the stored reference signals; and
    output continuously during the simulation a corrected plurality of simulated GNSS signals based on the calculated phase offset, time offset, and power offset;
    wherein the output of the simulation comprising the plurality of simulated GNSS) signals further comprises instructions to:
    output, continuously during the simulation, simulated interference signals, wherein each of the simulated interference signals comprises an interference signal mixed with another reference signal;
    convert calibration interference signals from the radiofrequency receiver to received simulated interference signals from the output simulated interference signals;
    calculate, continuously during the simulation, another phase offset, another time offset, and another power offset for each of the received simulated interference signals based on a cross correlation of each of the another reference signals for each of the received simulated interference signals in the calibration interference signal against a corresponding one of the stored another reference signals; and output continuously during the simulation a corrected plurality of simulated interference signals based on the calculated another phase offset, time offset, and power offset, wherein the output corrected plurality of simulated GNSS signals and the output corrected plurality of simulated interference signals are coherent.

12. The apparatus of claim 11 having stored thereon at least one additional instruction comprising executable code that when executed by one or more processors, cause the processors to:
   determine a cross-correlation peak between the calibration GNSS signal and at least one of the associated reference signals; and
   calculate the phase offset, the time, and the power offset based on the determined cross-correlation peak.

13. The apparatus of claim 11, wherein the plurality of simulated global navigation satellite system (GNSS) and interference signals are continuously output.

14. The apparatus of claim 11, wherein the simulated GNSS signals and the simulated interference signals are coherent.

15. The apparatus of claim 11, wherein the phase offset and the time offset are calculated in real-time.

\* \* \* \* \*